United States Patent Office 3,356,427
Patented Dec. 5, 1967

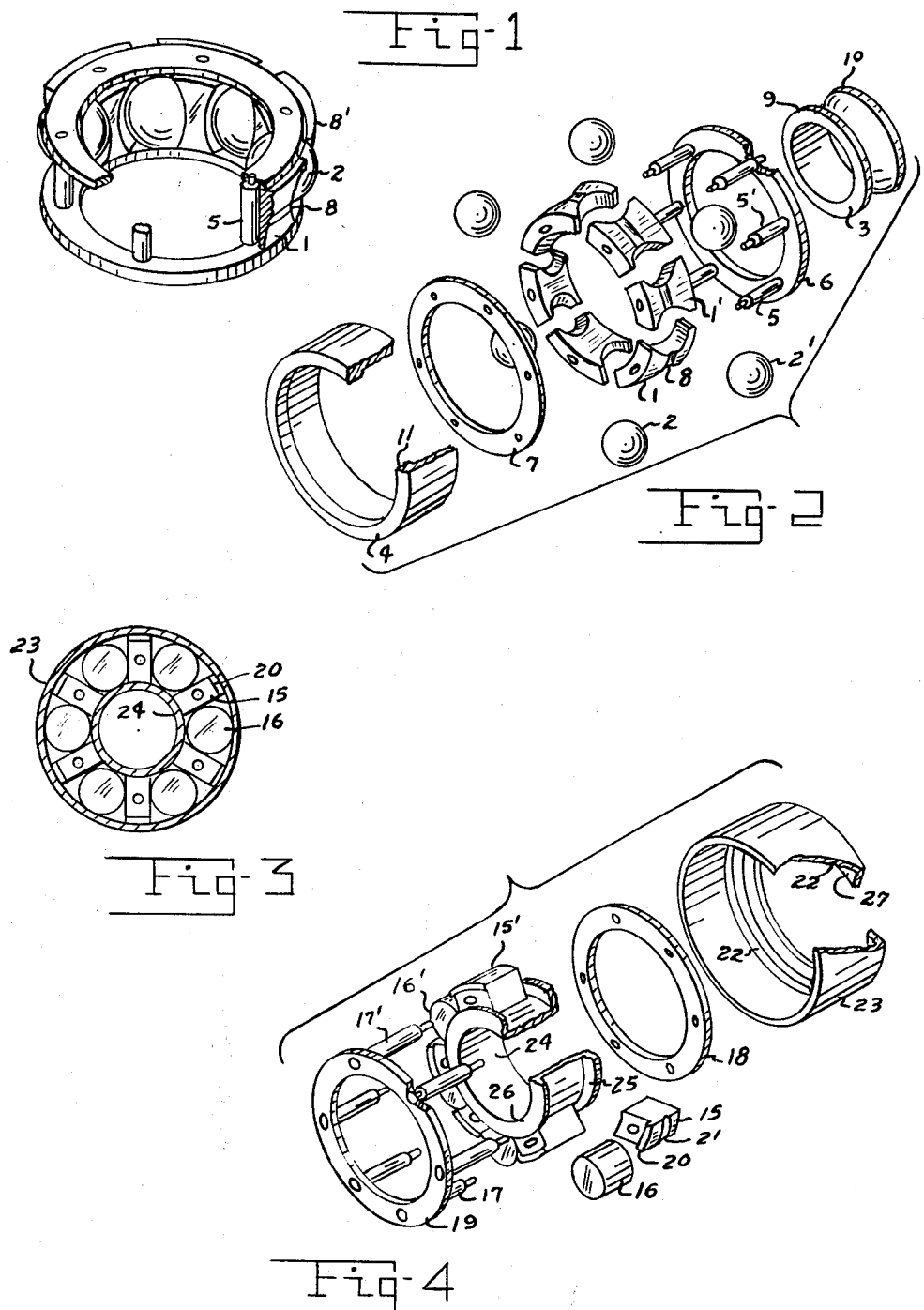

3,356,427
ROLLER ELEMENT BEARING-LUBRICANT
COMPOSITE SEPARATOR
Jan W. Van Wyk, Kirkland, Wash., assignor to the United States of America as represented by the Secretary of the Air Force
Filed Aug. 9, 1965, Ser. No. 478,498
3 Claims. (Cl. 308—187)

ABSTRACT OF THE DISCLOSURE

Bearing assembly of spherical balls or cylindrical rollers between nonrotating lubricant composition separators apertured for axially extending pins with their opposite pin ends riveted in cage rings as an assembled unit with balls or rollers revolving between inner and outer races and picking up lubricant from the separators during operation.

---

This invention relates to the lubrication of bearings for service in evacuated environments and, more particularly, to a composite separator lubricant as a structural part of the bearing and to the chemical composition of the composite separator lubricant.

Past practices in both ball bearing and roller bearing structures in evacuated or open environments may be illustrated by the Patent No. 1,699,325 issued to Dake and No. 847,487 issued to Maxwell. The Dake structure discloses filler blocks $B^1$ mounted on rivets $B^3$ on which antifriction rollers C are journalled between balls in their races. The Maxwell patent discloses race rolls 6 journalled on pins 7 between balls 5 between the ball races.

Previous attempts at the operation in a vacuum of commerically available bearings resulted in high friction and bearing failures due to excessive wear, local welding, and excessive lubricant debris within the bearing.

Use as a lubricant of molybdenum sulfide $MoS_2$ in its solid physical state is recognized in the art, of which the Patent 3,079,204; 3,051,535; and 3,014,865 may be taken as being illustrative.

The present invention has as its object the provision in both ball bearing and roller bearing assemblies of separator spacers made of hitherto undisclosed compositions undergoing frictional contact with the balls, or the rollers, for continuously film lubricating the rotary members in the assemblies, without external servicing and without the release of objectionable vapors or excessive heat.

The preferred compositions of the ball bearing and the roller bearing separators here of interest are by weight: (1) 90% $MoS_2$, 8% Fe and 2% Pt; (2) 80% $MoS_2$, 16% Fe and 4% Pd; or by range about from 80–90% $MoS_2$, 8–16% Fe and 2–4% Pt or Pd.

An illustrative embodiment of the present invention is shown in the accompanying drawings, wherein:

FIG. 1 is a fragmentary prospective view, partially broken away and in section, of a ball bearing assembly without its inner race for clarity;

FIG. 2 is a disassembled view of the bearing in FIG. 1;

FIG. 3 is an elevational view, partially in section, of a roller assembly that embodies the present invention; and FIG. 4 is an exploded view, partly broken away and in section, of the roller bearing in FIG. 3.

The ball bearing spacers or separators 1, 1', etc., in FIG. 1 of the drawing, are each positioned between pairs of the balls 2 and 2'. The ball bearing separator grouping is repeated around the bearing assembly between the inner and outer races 3 and 4, respectively. Each separator 1 is apertured axially for being mounted on a pin 5. The pins 5, 5', etc., extend between, and their ends are secured to, the cage rings 6 and 7 and the pins serve to mount the separators therebetween. Each separator 1 is waisted in between its ends that are amply broad to engage the outer race 4 in arresting the rotation of the separators.

Each separator is provided with a groove 8 in its radially outer face between the axial ends of the separator for housing in the groove bearing debris thrown outwardly by centrifugal force. The inner surface of each separator 1 conforms in curvature with the curvature of the radially outer surfaces of the axially spaced flanges 9 and 10 of the inner race 3. The outer race 4 has a flange 11 at one of its axial ends to serve as a positive stop for the cage ring 7 as the parts are assembled and used.

The bearing in FIG. 1 is assembled by passing the inner race 3 to a position centrally of the ring of ball bearing separators 1, 1', etc., threaded on the pins 5, 5', etc., and with the ball bearings 2, 2', etc., between the separators. The cage ring 7 is then advanced toward the cage ring 6 with the distal ends of the pins seated in the apertures in the ring 7 and riveted, welded, or otherwise secured in place. The assembled spacers, balls, pins, inner race, and cage rings 6 and 7 are then advanced axially into the outer race 4 with the cage ring 7 in engagement with the outer race flange 11 for an operative assembly.

In operation, the ball bearing assembly provides as lubricating members the ball bearings spacers 1, 1', etc., in pairs on the opposite sides of each ball bearing subjected to rotational forces. Lubricant material applied frictionally as films from the spacers 1, 1', etc., to the surfaces of the ball bearings provide adequate lubrication to the apparatus for extended periods of time. The spacers 1, 1', etc., maintain the ball bearings spaced from each other for free rotation at optimum distances away from the pins 5, 5', etc. Under both normal and optimum loads the discharge by centrifugal force of dust and fragmented material that results from the operation of the apparatus is accommodated by the grooves 8 in the spacers 1, 1', etc.

The preferred roller bearing assembly illustrated in FIGS. 3 and 4 comprises a desired plurality of separators or roller spacers 15, 15', etc. Each separator is positioned between to separate and to lubricate a pair of roller bearings 16, 16', etc. Each separator 15, 15', etc., is apertured axially for housing a pin 17, 17', etc., that serves to maintain the separator in proper position throughout its use. The pins 17, 17', etc., are riveted between the pair of cage rings 18 and 19.

Each separator 15, 15', etc., has a flange portion 20 that overlies the adjacent cage ring adequately for preventing the objectionable rotation of the separator around the pin on which the separator is mounted. Each separator 15, 15', etc., may or may not, as preferred, have a groove 21 in its radially outer face as an accommodation for housing frictional debris.

Further accommodation for frictional debris is provided by one or more grooves 22 in the inner surface of the outer race 23. It will be noted that the groove 22 in the inner face of the outer race 23 is spaced the thickness of the cage ring 18 from the outer race end flange 27, against which the cage ring 18 is positioned when assembled ready for operation. The inner race 24 is provided with flanges 25 and 26 on its opposite ends, for positioning and maintaining both of the separators 15, 15', etc., and the rollers 16, 16', etc., between the flanges.

In the lubricant composites that are disclosed herein, the pins prevent the composite from contacting the outer races with high loads under centrifugal force. The composite roller bearing separator 15, flange 20, and the composite roller bearing separator 1 expanded ends, and radially outer surface bearing against the inner surface of the outer race, minimize the rotation of the composite members on their supporting pins.

The separator constructions that are disclosed herein provide both ball and roller bearings for high-speed operation in a vacuum with minimized atmospheric contamination, bearing wear, and bearing failure.

Novel features of the bearing design that are disclosed herein are a preferred open 56% curvature in the ball bearing relief groove 8 and in the roller bearing relief groove 22, in the large raceway 23 disclosed herein, in decreasing ball-to-race sliding and to permit egress of debris generated within the bearing. A 1° taper on the thrust basis of the roller bearings 16 permit operation at elevated stress levels resulting in friction values that are below those of earlier bearings and that minimize surface wear on both the bearings and the raceways when they are film lubricated by the separators 1 and 15, that also are disclosed herein. Optimum sizes of both the ball and the roller bearings permit the use of smaller numbers of rolling elements providing the same load capacity as previous bearings.

The separator is controlled by contact of the lubricant composite material on the inner race lands. Illustratively, the clearances initially are 0.005 inch between the lubricant composite material and the inner race land and the clearance is 0.01 inch in the ball pocket in the assembled structure ready for use.

It is to be understood that the examples of the present invention that are submitted hereby are illustrations of satisfactorily operative reductions to practice of the present invention and that modifications may be made therein without departing from the spirit and the scope of the present invention.

I claim:
1. A bearing assembly for service in a substantially evacuated environment comprising a plurality of cylindrical roller bearings that are each freely rotatable, an inner bearing race with a cylindrical outer surface contacted by the cylindrical surfaces of the roller bearings, a pair of inner race flanges projecting radially outwardly from the inner race cylindrical surface to provide opposite end motion restrictions arresting the axial movement of the opposite ends of the roller bearings, a roller bearing lubricating separator between and lubricating both roller bearings adjacent to the bearing lubricating separator in the assembly and with a radially inner surface that substantially conforms in curvature with the curvature of the inner race surface that is contacted by the roller bearings and with a radially outer surface and the separator being apertured axially between its axial ends, a pair of cage rings dimensioned to accept the inner race flanges in axial registration therewith and to continue radially outwardly therefrom at the opposite ends thereof, a plurality of pins corresponding to the number of separators and each pin being disposed within the separator aperture and the opposite ends of the pins being secured in the cage rings, and an outer race with an inner surface contacted by the outer surface of the separators and by the cylindrical roller bearings and within which outer race are positioned the cage rings and the assembly therebetween and a frictional debris collecting groove provided in the inner surface of the outer race and not entered by the roller bearings.

2. The bearing assembly defined by claim 1 wherein the separators are of the composition range by weight of 80 through 90% $MoS_2$, 8 through 16% Fe and 2 through 4% selected from the group of Pt and Pd.

3. The bearing assembly defined by claim 1 wherein the contact area between the rotary member lubricating separator and the outer race exceeds the contact area between the lubricating separator of the rotary members and the inner race in stabilizing the nonrotary characteristic of the rotary member lubricating separator.

References Cited

UNITED STATES PATENTS

| | | | |
|---|---|---|---|
| 1,665,448 | 4/1928 | Dake | 308—201 |
| 2,946,633 | 7/1960 | Gothberg | 308—217 |
| 2,969,267 | 1/1961 | Gothberg | 308—217 |
| 3,051,535 | 8/1962 | Klint et al. | 308—240 |
| 3,179,478 | 4/1965 | Readdy | 308—187 |
| 3,239,288 | 3/1966 | Cambell et al. | 308—187 |

FOREIGN PATENTS

| | | |
|---|---|---|
| 177,975 | 3/1954 | Austria. |
| 852,128 | 10/1939 | France. |
| 16,436 | AD 1907 | Great Britain. |
| 284,619 | 7/1928 | Great Britain. |

MARTIN P. SCHWADRON, *Primary Examiner.*

FRANK SUSKO, *Examiner.*